Jan. 24, 1956 E. A. EBERT 2,731,760
AERATED BAIT CONTAINER
Filed Dec. 30, 1952 4 Sheets-Sheet 1
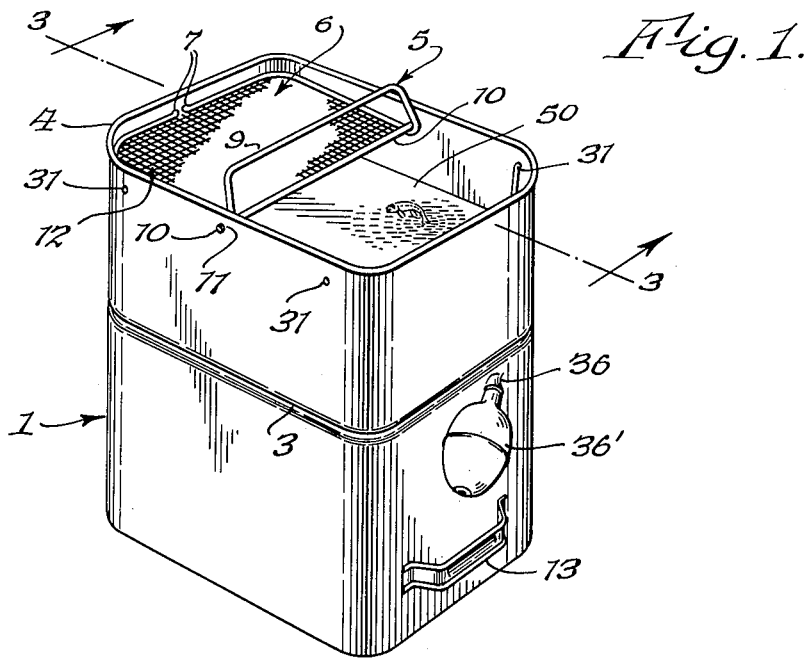
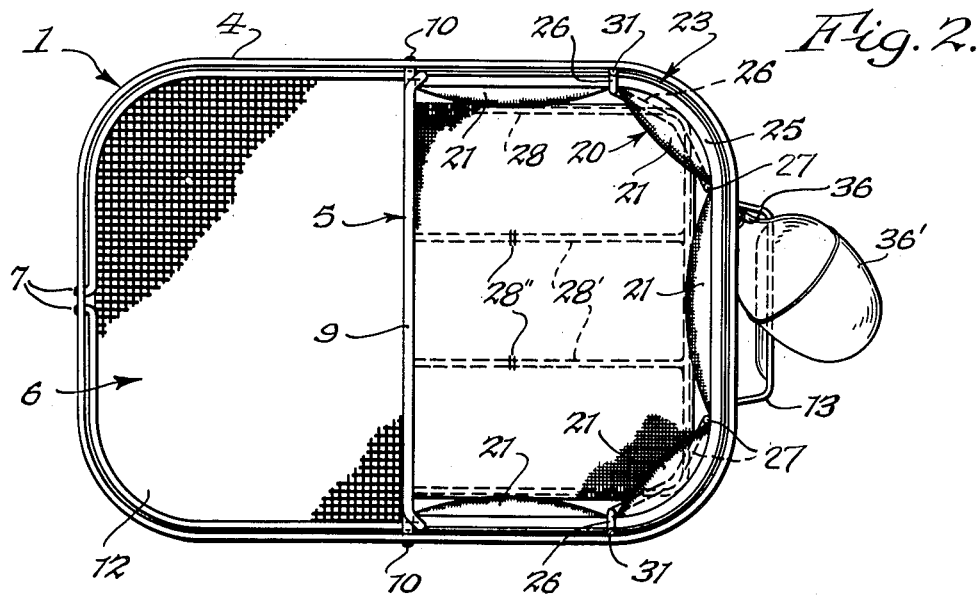
INVENTOR
Edward A. Ebert

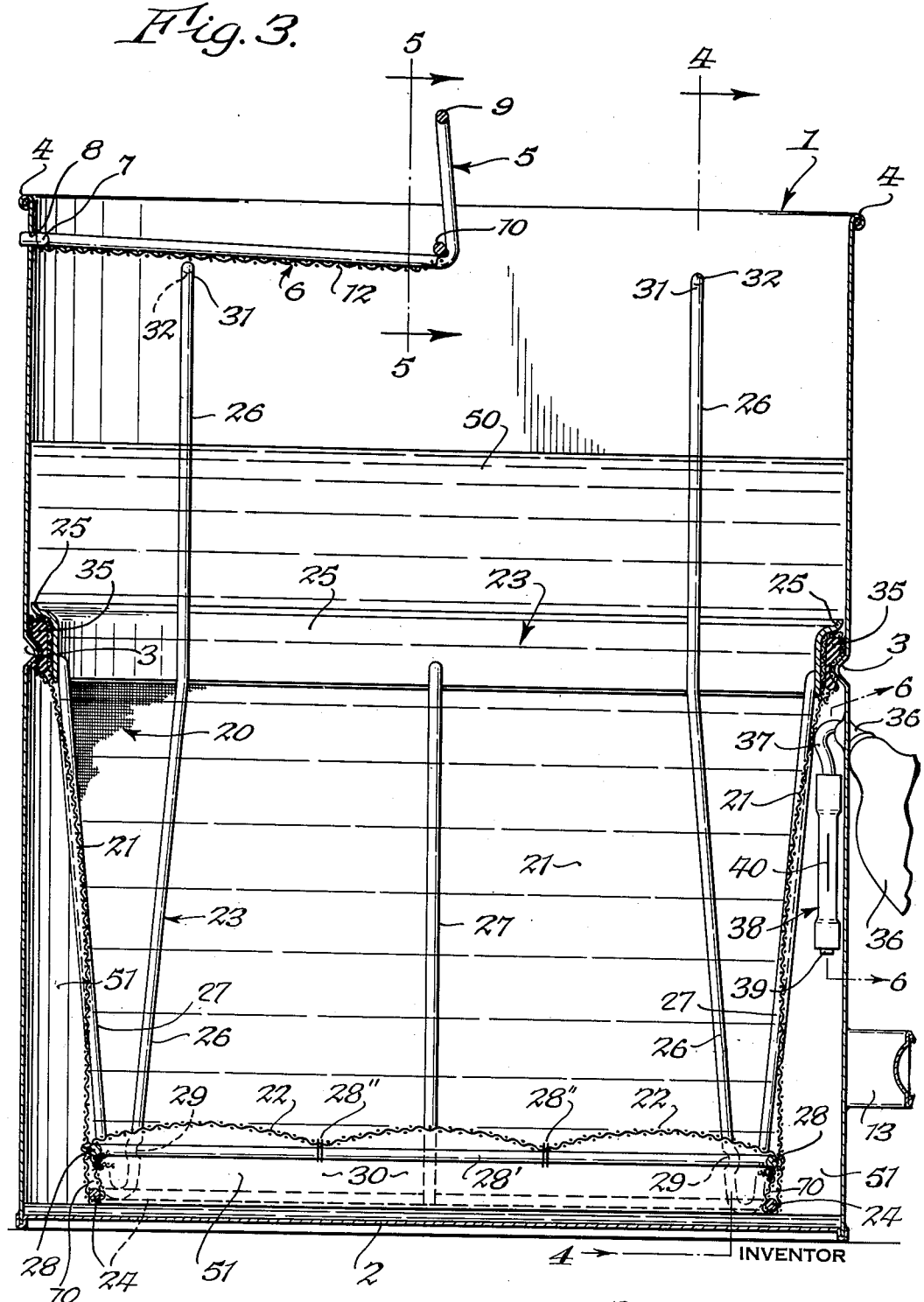

Jan. 24, 1956  E. A. EBERT  2,731,760
AERATED BAIT CONTAINER
Filed Dec. 30, 1952  4 Sheets-Sheet 3

INVENTOR
Edward A. Ebert

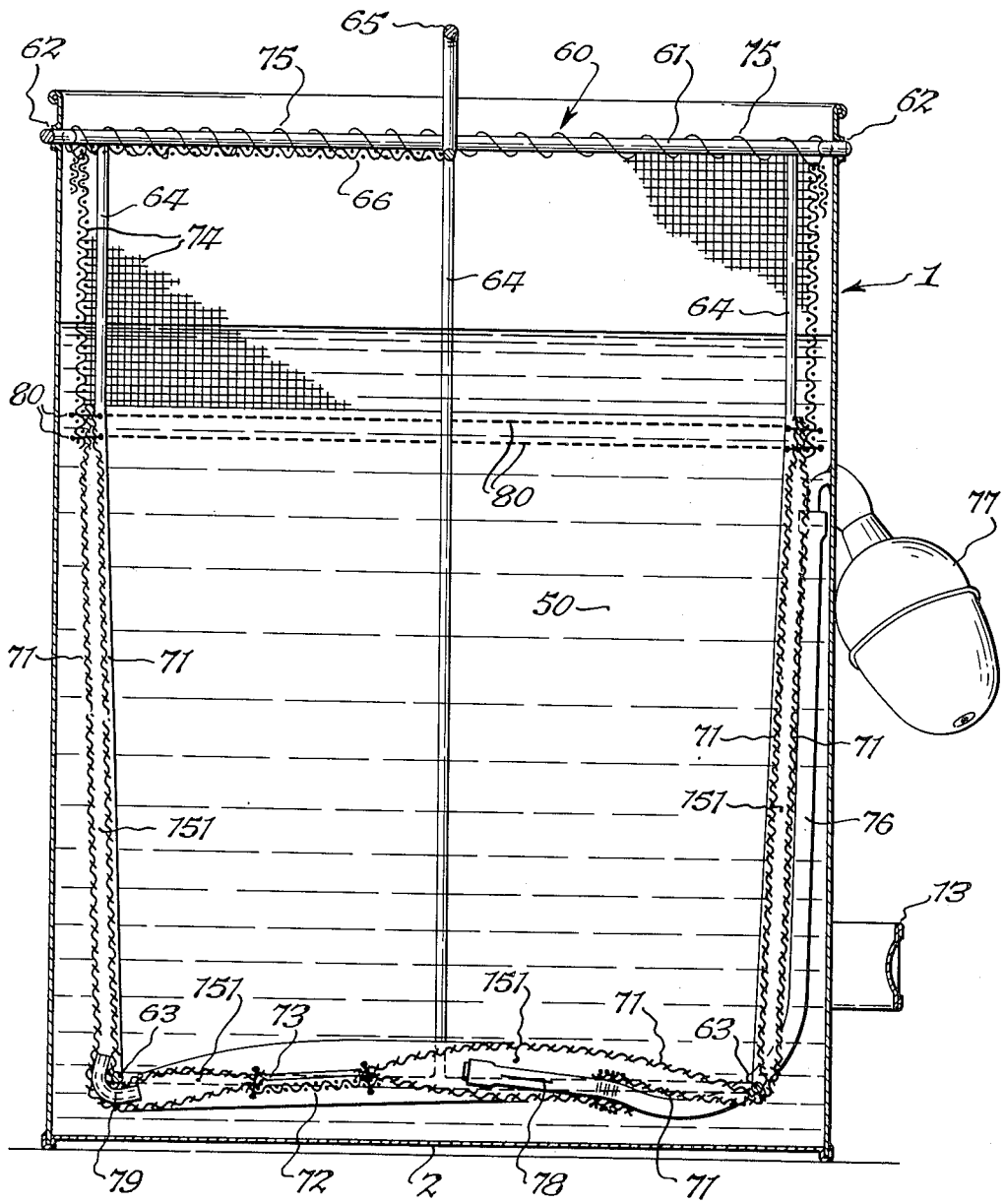

United States Patent Office 2,731,760
Patented Jan. 24, 1956

2,731,760

AERATED BAIT CONTAINER

Edward A. Ebert, Snyder, N. Y.

Application December 30, 1952, Serial No. 328,760

9 Claims. (Cl. 43—57)

This invention relates to means for effecting intimate contact between a gas, such as air or oxygen, and a liquid, such as water, to facilitate absorption of the gas by the liquid. More particularly the invention relates to the maintenance of a maximum amount of air or oxygen in suspension or solution in the water of a container used for storing live bait, such as minnows, so that such bait will remain active and healthy until used.

This application is a continuation (in part) of my co-pending application bearing Serial No. 573,455, filed January 18, 1945, now abandoned.

An object of the invention is to provide a large area of aeration surrounding the body of water in a bait container.

Another object is to provide this aeration over a prolonged period of time without the necessity of continuously supplying additional air to the aerator at frequent intervals.

Another object is to provide additional aeration to the water over and above that given by the aerator walls, by creating pressures sufficient to rupture the film of water sealing off the aerator apertures and thereby injecting the air into the water in a multitude of minute increments.

A further object is to apply aeration in such a way that the water will absorb the air more readily and more quickly than by ordinary means, such as by keeping the water at a more favorable temperature for absorption of air.

Another object is to provide a construction which permits replacement of the aerating element at low cost.

Other objects, advantages and capabilities of the invention will appear from the following description of several embodiments thereof.

In the accompanying drawings:

Fig. 1 is a perspective of a minnow bucket constructed in accordance with the invention and representing one embodiment thereof.

Fig. 2 is a plan thereof.

Fig. 3 is a vertical, central section taken approximately along line 3—3, Fig. 1.

Fig. 4 is another vertical section taken approximately along the line 4—4, Fig. 3.

Fig. 5 is a vertical cross section taken along the line 5—5, Fig. 3, showing the carrying bail and its mounting.

Fig. 6 is a section through the air valve, taken on line 6—6, Fig. 3.

Figs. 7 and 8 are sections through the valve taken approximately along the line 7—7, Fig. 6, Fig. 7 showing the valve closed and Fig. 8 showing the valve open.

Fig. 9 is a diagram showing the head or pressure of the water at various levels in the bucket.

Fig. 10 is a diagrammatic illustration of the water and air on either side of a perforate material showing the seal formed by the water film as a result of the surface tension thereof, bridging the perforations.

Fig. 11 is a sectional elevation of a minnow bucket also constructed in accordance with this invention, but illustrating another embodiment thereof.

In the embodiment of the invention shown in Figs. 1 and 2, a container 1 is provided of substantially rectangular form, the side walls of which are connected by rounded corners. This rectangular shape lends more readily to packing where space is at a premium and also provides a greater volume of water. Another advantage is obtained when dipping minnows out of the bucket, it being easier to catch them against a flat surface than against a cylindrical wall where they can sneak through the space created by the arc of the cylindrical wall.

The container 1 has a bottom 2, an inwardly indented peripheral bead 3 and a wire bead 4 along its upper edge. A combined bail handle 5 and pouring screen 6 is detachably mounted in one-half of the mouth of the container 1. The bail 5 consists of a wire bent to conform, with a small clearance, to the shape of the bucket, having its ends 7 turned to terminate in openings 8 in the vertical end wall of the container 1. The middle portion is bent upwardly to form a handle portion 9. A cross bar 10, welded or otherwise secured in the crook formed by the upwardly bent portion 9, is adapted to engage openings 11 in the vertical side walls of the container 1. A coarse screen 12 is secured to the bottom of the wire bail 5 and the cross bar 10. This provides a closure which permits pouring the water out of the container and dipping fresh water without losing the bait in the bucket. The remaining open part of the mouth of the container permits the netting of bait from the container and since the screen 12 has large openings, visibility into the container is not greatly impaired.

The combination bail 5 and screen 12 can be entirely removed as a unit by springing the side walls of the container 1, as shown in dotted lines in Fig. 5, enough to disengage the ends of the cross bar 10 from the openings 11 and then withdrawing the ends 7 from the openings 8. A handle 13 is attached to the lower part of the front end wall to facilitate pouring and dipping of water while the user is seated in a boat.

The indented annular bead 3 of the container 1 is provided to form a sealing shoulder to which the aerator 20 may be sealed. The aerator 20 comprises aerator side walls 21 and an aerator bottom 22. The side walls 21 are in this instance made of fine cotton fabric and the bottom 22 is of a coarser fabric, although both side walls 21 and bottom 22 may be both made of the same fine fabric.

The aerator 20 is slipped over a frame 23 which is made up of a rectangular lower member 24 and an upper band 25 which conforms to the contour of the container 1 and vertical connecting legs 26 at the corners and central legs 27.

Another removable rectangular bottom member 28 is provided which is sprung into notches 29 in the lower ends of the vertical connecting legs 26 and 27. The bottom member 28 has cross bars 28' to which the bottom 22 may be stitched at intervals as at 28''. This bottom member 28 position in this manner provides an air trap 30 in the lower portion of the aerator 20, as will be explained later. Four of the vertical legs 26 extend above the upper band 25, above the water level and are biased so that they urge their hooked ends 31 into openings 32 in the side walls of container 1, thus locking the aerator 20 and frame 23 in the container 1 securely yet in a manner which makes removal very easy.

The procedure to insert the aerator 20 into the container 1 is as follows:

The aerator frame is inverted, the aerator 20 is turned inside out and with the bottom down. Then, the bottom member 28 is inserted into the aerator 20 and the open end of the aerator 20 is brought through the lower member 24 of the aerator frame 23. The bottom member 28 with the fabric of the aerator between it and the aerator frame 23 is snapped into the notches 29 in the legs 26 and 27. The open end of the aerator is then rolled down over the aerator frame 23 until its side walls 21 hang below the band 25 of the frame 23.

A seal 35 in the form of a rubber or felt band is then slipped over the aerator and frame and positioned at the band 25 holding the aerator 20 in place. The portion of the aerator below the band 25, the frame and all still in an inverted position, is then rolled back onto the seal 35. Fabric now covers the seal 35 all around, this making a tighter seal when wet than would the bare rubber thereof alone.

The whole unit, aerator, frame and seal are now turned and with the bottom down, inserted into the container 1. The seal portion is brought to bear on the bead 3 and the hooked ends 31 of the vertical legs 26 are snapped into the openings 32, as shown in Figs. 3 and 4.

In the front end wall of the container 1, a sleeve 36 is provided. This sleeve is positioned just below the bead 3 and mounts a bulb type pump 36' on its outer end. Soldered into its inner end the sleeve 36 carries a tube 37 which projects into the air chamber formed by the enclosure or aerator and the wall of the container 1. A check valve 38 is slipped over the end of the tube 37. This valve consists of a short length of molded tubing closed at its one end by a plug 39 and having an intermediate portion slitted, as shown at 40 in Figs. 3, 6, 7 and 8. Being of molded rubber or the like, the slit 40 will stay closed until pressure inside the tube 38 forces it open. External pressure around the outside will only serve to close the slit 40 more tightly.

The fact that liquids have surface tension, is taken advantage of, to provide an air space and a water space in the container, both being in intimate contact with each other. Further the head or weight of the liquid is used to maintain the air under pressure until all of it has been absorbed into the water.

Air under pressure in contact with a large area of water, in this particular instance approximately 230 square inches, assures absorption of large amounts of this air into the water at a relatively high rate. Some additional air will be absorbed at the top surface of the water in the container, approximately 65 square inches, at normal atmospheric pressure.

I have used cotton fabric having 78 threads to the inch, with openings of approximately .005 of an inch for both side and bottom walls of the aerator 20. However, when it is desired, the bottom wall 22 may be made of a material having larger openings, such as a fabric having 39 threads to the inch, with openings of approximately .025 of an inch. These fabrics when used in the instant device with 8½ inches of water, as shown in Fig. 9, performed in a very satisfactory manner and held air under pressure greater than the head or water pressure. Even fabric having openings or perforations of 1/32 of an inch by 1/16 of an inch, or an area of about .00195 of a square inch, with 12½ threads to the inch one way and 20 threads to the inch the other, has retained air in a satisfactory manner.

When using 90 mesh screen cloth, openings of approximately .0035 of an inch, this material functioned satisfactorily.

Any of these screen cloths, whether made of cotton fabric or metal, must be capable of freely passing, when dry, air under normal atmospheric air currents or winds. These screen cloths, when wet, are also capable of freely passing water. However, when there is air on one side and water on the other side of these screen cloths, the surface tension of the liquid will seal off the apertures of the screen cloths and prevent either air or liquid from passing through unless sufficient pressure is applied to rupture the film or skin caused by the surface tension of the liquid.

I have found that a higher pressure of air can be built up behind the aerator walls 21 and 22 when a finer mesh material is used, this being the result of air surface between the meshes of said material being a smaller amount of air area exposed. When a material having openings too large is used, there is a tendency, when under vibration or shock, for the air to leak out in the form of bubbles. Therefore, it is desirable to choose an opening size for the greatest possible air area which will also hold a certain air pressure and yet be stable under ordinary conditions and not lose air when the bucket is moved from place to place, such as riding over rough roads.

The aerator is constructed so that this aeration means is placed so as to surround the water in the container, giving proper distribution of aeration. It will be noted that the aerator chamber 51 has side and bottom portions conforming generally to the bottom and side walls of the container and arranged adjacent to said walls.

Further aeration can be accomplished at the will of the operator by forcing air through the aerator in the form of thousands of fine bubbles by creating excessive pressure in the aerator.

Excessive pressure ruptures the film on the water arising from the surface tension thereof, and the air is then injected into the water in increments, depending on the size of the apertures in the aerator fabric. It is obvious that when this occurs a change of air takes place in the aerator giving a fresh supply and a circulation of the water also takes place, since the bubbles raise water with them as they rise to the surface. Exhaustive tests and experimentation with live bait and the constructions shown have proven the benefits of aeration in this.

To set the bucket in operation, the container 1 is filled with water to a point slightly above the band 25. This wets the aerator and seal at the bead 3 and the surface tension of the water can now go into effect to seal off any air which is trapped or pumped into the enclosed air space or chamber 51 between the aerator and the container 1. If the aerator is dry when filling is taking place, the air space will fill with water.

After having filled the container to the correct level, bait is then placed in it. The pump 36' is then operated and water in the space 51 will be forced out through the fabric of the aerator 20 but the air will be confined in the air space by the surface tension of the water on the aerator fabric. The water level in the air space will continue to drop until it reaches a point at the lower member 24, whereupon air will bubble up into the trap 30.

This trap 30 is formed by aerator wall 21, which extends downwardly to the lower member 24, thence under the lower edge of this member, continuing upwardly where it joins the bottom aerator wall 22, which extends over the member 28.

Referring to Figs. 3 and 4 and as also illustrated in the diagrammatic showing in Fig. 9, it will be noted that the inner and outer portions of the aerator side wall 21, extending between the members 24 and 28, are spaced from each other to provide therebetween an annular depending chamber or sump 70. As air bubbles under the lower edge of the member 24 into the trap 30, and collects under the bottom aerator wall 22, this air displaces water which passes into the annular sump chamber 70 through the inner stretch of aerator wall 21 between the members 24 and 28. Thus, as additional air enters the trap 30, more of the water in this trap is forced into the sump chamber 70 referred to, and then to the main body of water 50.

If the wall 21 did not extend down and then up, there would be no escape for the water to get out of the air trap 30 and it could not be completely filled with air. In fact, water cannot be removed below this point, i. e., below the member 24, the lowest point at which an outlet is provided.

It will now be seen that the bait and the water are almost completely surrounded by air at the bottom, sides and top. Also, this air is under pressure, and it is a known fact that liquids will absorb gases in greater volume when under pressure while in contact with them.

As will be seen in the diagram of Fig. 9, the pressure in the air space is approximately .2888 pound per square inch when the aerator is full and there is a head of eight inches of water above the bottom wall 22. It actually would be .2888 pound per square inch plus the weight of a column of water of unit area having the height of the vertical wall forming the trap 30. However, this pressure can be increased to the point where the air films rupture and air passes through the perforations in the fabric into the water space.

Fig. 10 illustrates the fabric aerator 20 greatly magnified, with the water 50 bearing downwardly and the air in space 51 pushing upwardly. The water film or skin 52 is stretched between the elements 21a of the fabric and across the spaces 21b between adjacent pairs of the elements 21a, this water film 52 being the only barrier between the water 50 and the air in space 51. The pressures of air and water are almost equal at the skin 52, when there is only a thin section or depth of air, since the air is under whatever pressure the head of water may be. If a tall section of air like that shown in space 51 in Fig. 9, exists, the water pressure would vary from the top of the section 21 to its bottom at 22, it being greater at the bottom because of more head or weight of water. Therefore, the air would be under pressure equal to the head of the water at the lowermost part of the air section.

As will be observed in Fig. 9, the water pressure varies along the vertical wall 21 as one nears the top, it becoming less while the air pressure in the aerator remains the same, top or bottom. Therefore, if the side and bottom walls of the aerator 20 are made of a material having apertures of similar size, rupture of the air film will take place at a point where the air film is weakest when excess air pressure is created in the aerator chambers 51. This would be near or at the upper portion of the side walls since the water pressure or weight of the column of water of unit area at this point is the least. If it is desired to have all of the air bubbles pass through the bottom wall of the aerator, when excess air pressure is created, the bottom wall 22 is made of a material having apertures of such a size, larger than the side walls, that the air films will rupture at the bottom only.

It is obvious that more benefit will be derived if the bubbles are released from the bottom and traverse a longer path to rise to the surface, this prolonged contact giving greater aeration. Small openings have a stronger film or skin arising from the surface tension of the liquid, while larger openings have a weaker skin. This fact makes it possible to get higher pressure and have the bubbling take place from the bottom.

It is not necessary to continuously maintain enough pressure to create bubbles since air is being continually absorbed through the perforations in the fabric into the water, sides and bottom and also at the surface. However, in summer, when temperatures are high and water holds less air, bubbling of air through the water effects some cooling through the evaporation of the water and expansion of the bubbling air besides additional aeration.

Also to be noted is that the air in the air spaces 51, between the side walls and the bottom of the container and the aerator 20, provides a thermal insulation space which helps keep the temperature of the water to a safer degree.

Incidental to the fact that the aerator provides aeration, its resilient, inflated walls provide a cushion against which a minnow is less likely to be injured while being caught with a dip net. Also minnows have a tendency to blindly dash about when frightened, dashing and banging their heads against the walls of the container. This, of course, is not conducive to long life when the walls are of hard material.

Fig. 11 illustrates a modified construction of my invention. In Fig. 11 the container 1 receives a frame 60 having an upper ring 61 provided with lateral projections which spring into lock openings 62 in opposite walls of the container 1, and a lower ring 63 disposed adjacent the bottom wall 2 of the container and connected to the upper ring by a series of spaced legs 64. This frame 60 also includes a bail 65 connected to the upper ring 61, one-half of which is covered by a pouring screen 66. The aerator 71 in this form of the invention is made with double walls of fabric, both sides and bottom, and is fitted over the frame 60 and encloses an aerator chamber 151. A coarse screen 72 covers an opening 73 in the bottom of the aerator and another screen 74 forms an upper band by which the aerator 71 is held onto the frame 60. The bottom opening 73 and screen 72 in conjunction with the upper band screen 74 permits circulation of aerated water from the outside wall of the aerator into the inside area, but prevents the bait from getting into the space between the container walls and the aerator 71. Lacing 75 or any other satisfactory means holds the band screen 74 on the upper part of the frame 60, and since the aerator 71 is sewn, as at 80, to the lower edge of the band 74, it is held on the frame 60.

A tube 76 connects the aerator to the pump 77, and its other end is plugged and slitted as at 78 to form a check valve like the one shown in Fig. 6. Small tubular elbows 79 may be placed in the bottom of the aerator 71 where the material goes around the lower ring 63 of the frame 60 to the side walls to facilitate passage of air from the bottom to the side walls.

As in the first form of the invention shown in Figs. 1–10, this aerator 71 may have both the side and bottom walls made of a fabric having apertures of the same size, or if desired, the bottom walls may have coarser apertures so that most of the bubbling will take place from the bottom when excess air pressure is created in the air chambers 151.

Inflation or over inflation of the aerator chamber 151 and its resulting operation is similar to that shown in the first form of the invention, and further explanation is deemed unnecessary.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. A bait bucket, comprising a container to hold a liquid, a generally cup-shaped aerator wall arranged within said container and spaced from said container, and having its upper part arranged below and adjacent the normal level of liquid maintained in said container, a frame mounted on said container and supporting said wall, an enclosed air chamber including said wall within the container, said wall over substantially its full area being formed of a perforated material, the perforations of which are each not greater than about .00195 of a square inch in area and which freely pass air when the surface of said wall is dry or which freely pass liquid when liquid is on both sides of said wall but which perforations are each bridged over by a film of said liquid due to surface tension thereof when said material is wetted and has air on one side and liquid on the other, said films resisting free passage of air therethrough into said liquid but maintaining intimate contact of the air and liquid for absorption of the former by the latter, said films also being subject to rupture by air pressure applied thereto of sufficient magnitude to break said films to allow ingress of said air into the liquid in minute increments through said perforations, and means arranged to supply compressed air to said chamber.

2. A bait bucket as set forth in claim 1, wherein the perforations in the bottom portion of said aerator wall are of a greater size than those in the side portion of said aerator wall.

3. A bait bucket, comprising a container to hold a liquid, a generally cup-shaped aerator wall arranged within said container, a frame supporting said wall, said wall being sealed along its upper edge to said container and below that edge largely spaced from said container to provide an air chamber below said upper edge between said wall and container, said upper edge of said wall being arranged below and adjacent the normal level of liquid maintained in said container, said wall over substantially its full area being formed of a perforated material, the perforations of which are each not greater than about .00195 of a square inch in area and which freely pass air when the surface of the wall is dry or which freely pass liquid when liquid is on both sides of the wall but which perforations are each bridged over by a film of said liquid due to surface tension thereof when said material is wetted and has air on one side and liquid on the other, said films resisting free passage of air therethrough into said liquid for absorption of the former by the latter, said films being subject to rupture by air pressure applied thereto of sufficient magnitude to break said films to allow ingress of said air into the liquid in minute increments through said perforations, and means arranged to supply compressed air to said chamber.

4. A bait bucket as set forth in claim 3, wherein the perforations in the bottom portion of said aerator wall are of a greater size than those in the side portion of said aerator wall.

5. A bait bucket, comprising a container to hold a liquid, a generally cup-shaped aerator wall arranged within said container and spaced from said container, and having its upper part arranged below and adjacent the normal level of liquid maintained in said container, a frame mounted on said container and supporting said wall, an enclosed air chamber including said wall within the container, said wall over substantially its full area being formed of a perforated material, the perforations of which are each not greater than about .00195 of a square inch in area and which freely pass air when the surface of said wall is dry or which freely pass liquid when liquid is on both sides of said wall but which perforations are each bridged over by a film of said liquid due to surface tension thereof when said material is wetted and has air on one side and liquid on the other, said films resisting free passage of air therethrough into said liquid but maintaining intimate contact of the air and liquid for absorption of the former by the latter, said films also being subject to rupture by air pressure applied thereto of sufficient magnitude to break said films to allow ingress of said air into the liquid in minute increments through said perforations, said aerator wall having side and bottom portions, said bottom portion being raised above the lowermost extent of said side portion to provide a downwardly opening air trap, and means arranged to supply compressed air to said chamber.

6. A bait bucket as set forth in claim 5, wherein the perforations in said side portion of said aerator wall are smaller than the perforations in said bottom portion.

7. A bait bucket, comprising a container to hold a liquid, a generally cup-shaped aerator arranged within said container and spaced from said container, said aerator having double-walled side and bottom portions and having its upper part arranged below and adjacent the normal level of liquid maintained in said container, a frame mounted on said container and supporting said aerator, at least one of said double walls over substantially its full area being formed of a perforate material, the perforations of which are each not greater than about .00195 of a square inch in area and which freely pass air when the surface of the wall is dry or which freely pass liquid when liquid is on both sides of the wall but which perforations are each bridged over by a film of said liquid due to surface tension thereof when said material is wetted and has air on one side and liquid on the other, said films resisting free passage of air therethrough into said liquid but maintaining intimate contact of the air and liquid for absorption of the former by the latter, said films also being subject to rupture by air pressure applied thereto of sufficient magnitude to break said films to allow ingress of said air into the liquid in minute increments through said perforations, and means arranged to supply compressed air to the space between said double walls.

8. A bait bucket as set forth in claim 7, wherein the perforations in the bottom portion of said one of said double walls are of a greater size than those in the side portion of said wall.

9. A bait bucket, comprising a container to hold a liquid, a generally cup-shaped aerator arranged within said container and spaced from said container, said aerator having double-walled side and bottom portions and having its upper part arranged below and adjacent the normal level of liquid maintained in said container, a frame mounted on said container and supporting said aerator, at least one of said double walls over substantially its full area being formed of a perforated material, the perforations of which are each not greater than about .00195 of a square inch in area and which freely pass air when the surface of the wall is dry or which freely pass liquid when liquid is on both sides of the wall but which perforations are each bridged over by a film of said liquid due to surface tension thereof when said material is wetted and has air on one side and liquid on the other, said films resisting free passage of air therethrough into said liquid but maintaining intimate contact of the air and liquid for absorption of the former by the latter, said films also being subject to rupture by air pressure applied thereto of sufficient magnitude to break said films to allow ingress of said air into the liquid in minute increments through said perforations, said aerator being provided at said upper part with a foraminous band and at its bottom with an opening covered by a foraminous sheet to provide for circulation of liquid around the inside and outside walls of said aerator, and means arranged to supply compressed air to the space between said double walls.

References Cited in the file of this patent

UNITED STATES PATENTS

| | | |
|---|---|---|
| 950,999 | Erlwein et al. | Mar. 1, 1910 |
| 2,032,274 | Fonos | Feb. 25, 1936 |